Patented Sept. 20, 1927.

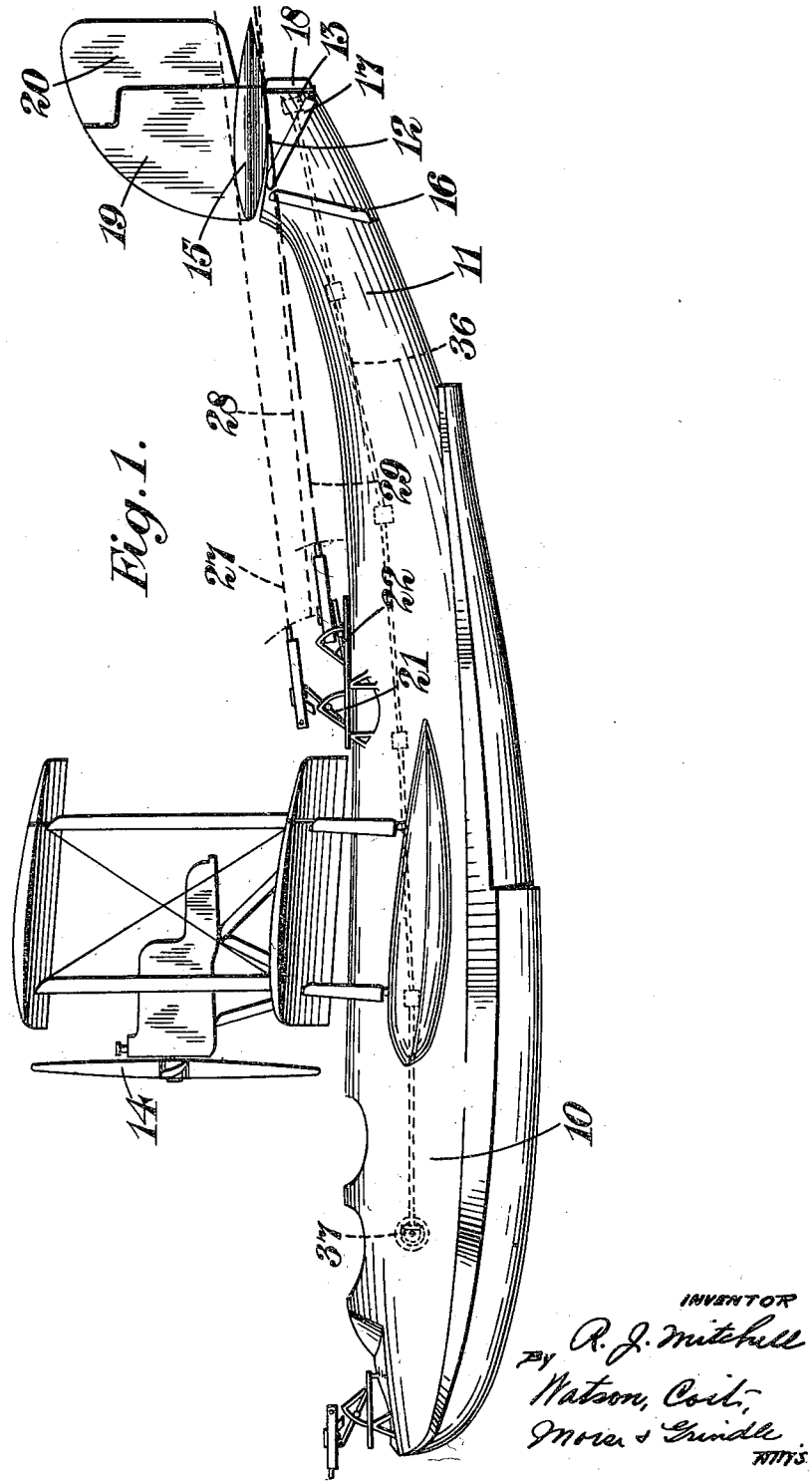

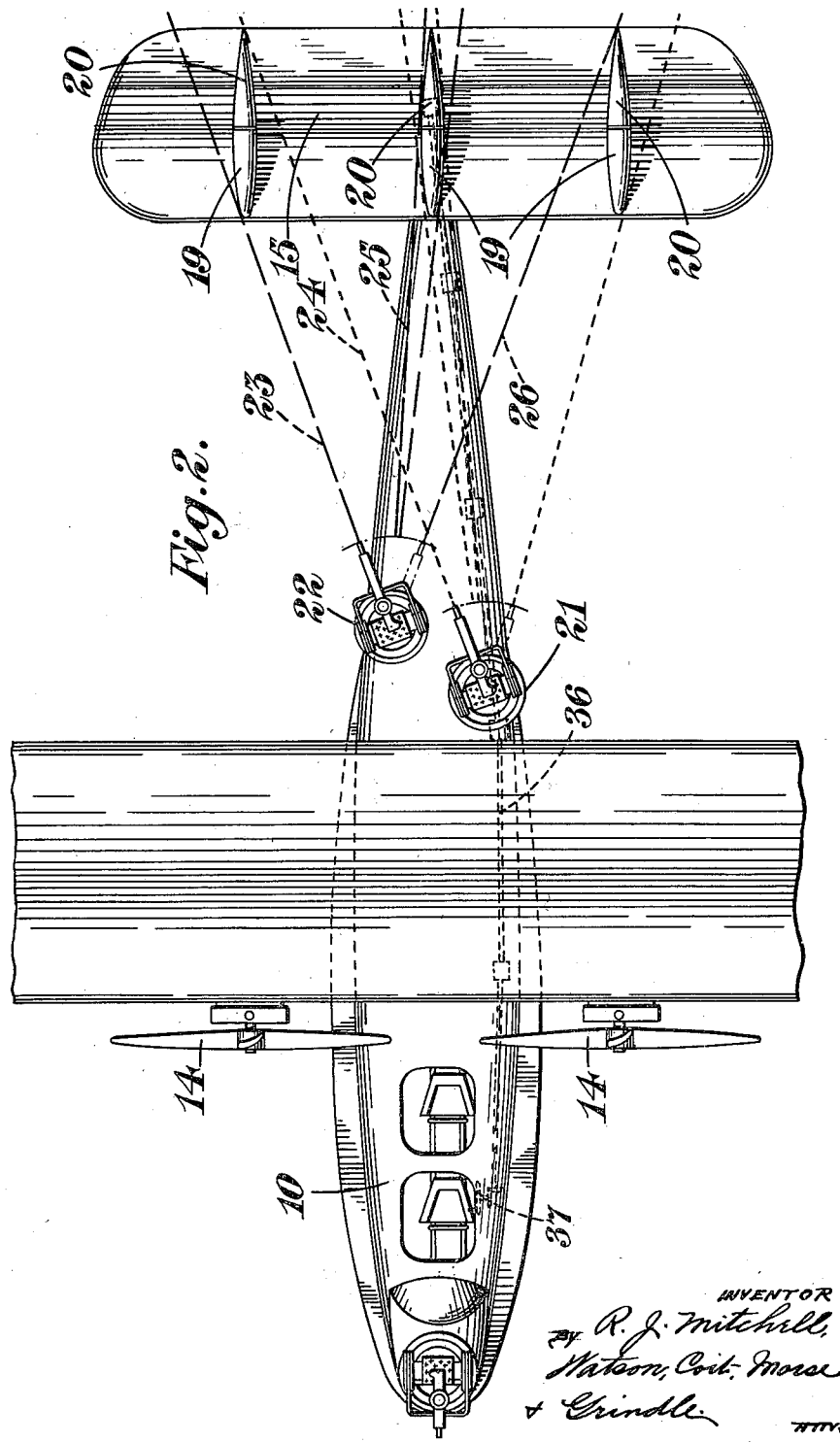

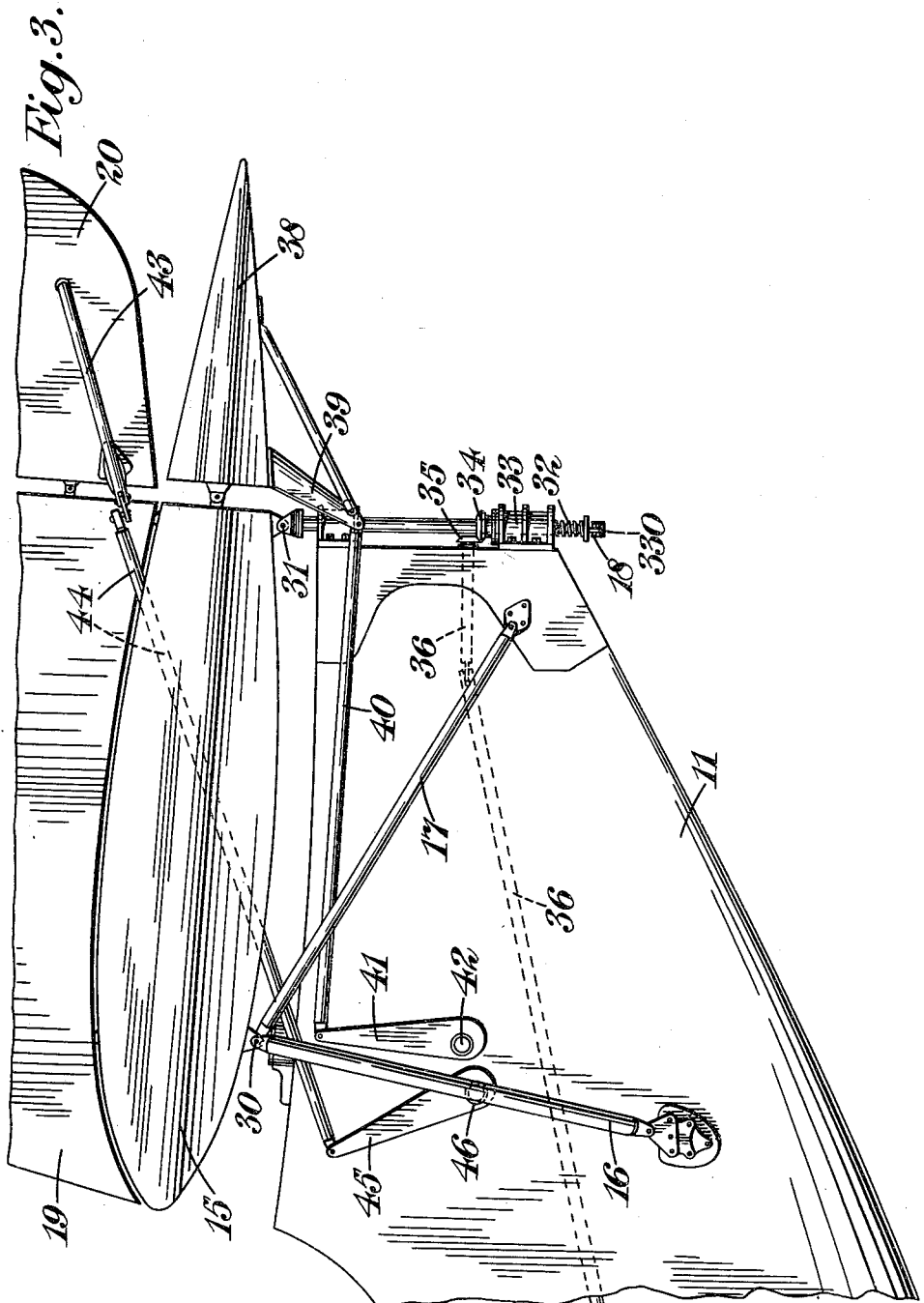

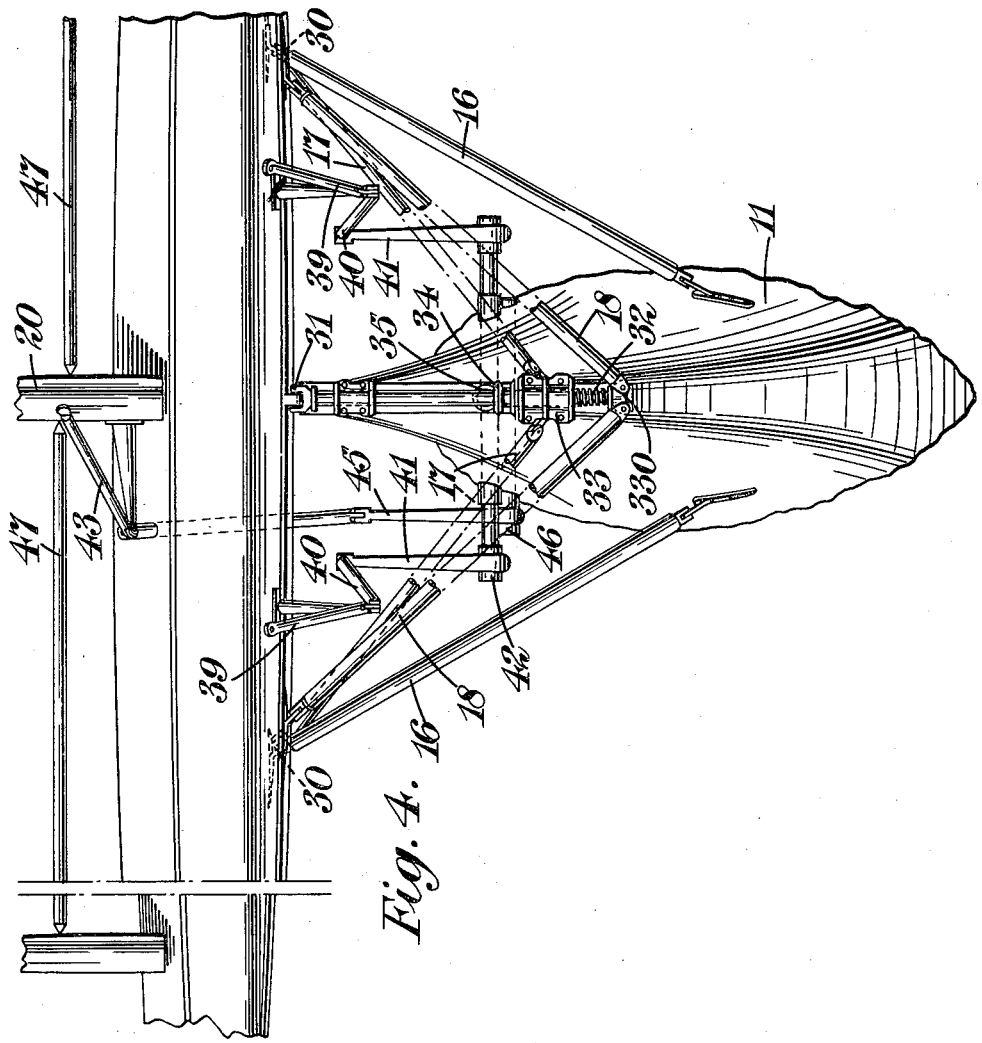

1,642,686

UNITED STATES PATENT OFFICE.

REGINALD JOSEPH MITCHELL, OF SOUTHAMPTON, ENGLAND, ASSIGNOR TO THE SUPERMARINE AVIATION WORKS LIMITED, OF SOUTHAMPTON, ENGLAND, A BRITISH COMPANY.

FLYING BOAT AND LIKE AIRCRAFT.

Application filed November 28, 1925, Serial No. 71,924, and in Great Britain November 29, 1924.

This invention is for improvement in or relating to aircraft of the "heavier-than-air" type, such for example as flying-boats, and has for its object to provide an improved construction of the same which offers various advantages to such aircraft in general and also special advantages in the case of armed aircraft.

According to this invention, there is provided in a tail-plane unit for aircraft of the type described, the combination with a tail-plane, of one or more vertical fins supported solely as cantilevers from the surface thereof, together with an elevator and one or more rudders hinged to the said parts in the usual manner.

With this construction the use of struts the bracing-wires in connection with the various parts of the tail-plane unit can be entirely or practically entirely avoided.

According to another feature of this invention there is provided in combination with a tail-plane unit as above set forth, a pivotal mounting and means whereby the tail-plane can be adjusted, even whilst in flight, to vary the angle of incidence according to the particular requirements of loading or otherwise of the machine.

The improved tail-plane unit as above described offers special advantages when used on armed aircraft, for the following reason. It is desirable to provide an armed aircraft with a gun or guns which fire rearwardly, but hitherto it has not been satisfactory to mount these guns in the hull or fuselage because of the large area of fire blanked off by the tail-plane unit and its struts or bracing-wires. In order to provide effective protection in a rearward direction, it has been proposed in flying-boats to provide additional nacelles, for example on the top plane, so that their line of fire was above the tail-plane unit. The use of such extra nacelles, however, greatly reduced the performance of the machine owing to the increased head-resistance offered by them. According to another feature of the present invention, these disadvantages can be overcome by the use in combination with a tail-plane unit as above set forth, of two gun-mountings so spaced apart in the same fuselage as to provide parallel or substantially parallel lines of fire across the front and rear edges or along the two sides of the vertical fins of the tail-plane unit according to these fins are remote from or near the centre line of the fuselage; these guns which are on the upper side of the fuselage are preferably also so disposed as to provide parallel or substantially parallel lines of fire above and below the tail-plane and elevator.

According to another feature of this invention, as applied to flying-boats or like aircraft in which the airscrew is situated above the hull, the hull is curved upwardly and rearwardly, so that it terminates in such a position that a tail-plane unit as above set forth can be directly attached to it with the tail-plane situated in the desired position relatively to the slip-stream of the airscrew.

According to yet another feature of this invention, the vertical fins and rudders provided on aircraft of the type above set forth may, if thought desirable, exceed in number the airscrews used on the vessel, and some only of them may be arranged to be in a slip-stream. The reason for this arrangement is that when a rudder operates in a slip-stream, it is more effective (that is, a given angular movement of the rudder gives a bigger turning effect) than it would otherwise be, but when the engine power is shut off so that the slip-stream is absent there is a marked diminution in the effectiveness of the rudder, and this may cause difficulties in the control of the vessel. By arranging that some of the rudders work normally not in a slip-stream, the change in the effectiveness of the rudders when shutting off the engine-power is reduced, so that the pilot can still maintain effective control over the vessel.

In the accompanying drawings which illustrate the invention applied, by way of example, to a flying-boat—

Figure 1 is a side elevation;

Figure 2 is a plan, with parts of the main planes broken away,

Figure 3 is a side elevation showing the rear end of the hull and the tail-plane mounting, and Figure 4 is an end elevation of the parts shown in Figure 3 looking from the right in that figure.

Like reference characters indicate like parts throughout the several figures of the drawings.

Referring to these drawings, the hull of the flying-boat, indicated generally by the reference 10, is curved upwardly, as shown at 11, towards the stern, and terminates in a substantially horizontal portion 12 adjacent the stern-post 13, this horizontal portion 12 being situated at such a height that a tail-plane mounted directly on it is correctly positioned with respect to the slip-stream of the airscrew or airscrews 14.

The tail-plane itself indicated at 15 is so constructed that it need be supported only at the middle of its length, taking the stresses to which it is subjected as a double cantilever, and it is mounted directly on the flattened portion 12 aforesaid of the hull. If it is desired, small struts 16, 17, 18 may be provided to give additional support to the tail-plane, but they are arranged to extend only a short distance from the hull so that they do not blank off any substantial field of gun-fire from guns situated in the hull.

The adjustable mounting for the tail-plane is illustrated in greater detail in Figures 3 and 4.

The tail-plane 15 is provided with a hinge-mounting whereof the pivotal axis is shown at 30, adjacent the front spar of the plane, see Figure 3. The actual hinge-joint is constituted by three separate hinges, one at the middle of the length of the tail-plane where it is secured to the upstanding part of the hull 11, and one at each side where the hinge-member is connected to short struts 16, 17. The rear spar of the tail-plane is connected by a pin-joint, whereof the axis is shown at 31 in Figure 3, to a screw-threaded spindle 32 which is mounted in suitable bearings on the stern-post of the hull. At its lower end this spindle carries a bracket 330 from which two struts 18 extend laterally for a short distance to provide additional support for the rear edge of the tail-plane as shown in Figure 4.

The spindle 32 is engaged by a nut-member which is rotatable in a housing 33 but is incapable of movement longitudinally of its axis, so that rotation of the nut-member causes the spindle 32 to be raised or lowered and thereby causes the rear edge of the tail-plane to be raised or lowered to alter its angle of incidence, as desired.

The nut-member aforesaid is rotated by means of bevel-gearing 34, 35 through a suitably jointed shaft 36 which extends forward as shown in Figures 1 and 2 to a control-wheel 37 situated at a convenient point for manipulation by the pilot.

Since the elevator 38 is hinged to the rear edge of the tail-plane 15, it partakes of the vertical adjusting movements thereof. The controlling means for the elevator are therefore arranged to pass as closely as is convenient to the hinge axis 30 about which the tail-plane turns in order that adjustment of the tail-plane shall not materially affect the setting of the elevator 38 with respect to the tail-plane. As shown most clearly in Figures 3 and 4, a pair of brackets 39 secured on the elevator are connected by strut-like members 40 to a pair of levers 41 which are mounted on a rotatable shaft 42. The ends of these levers 41 whereto the members 40 are connected are situated in the neighbourhood of the pivotal axis 30, and the usual control tables are connected in any suitable manner to the shaft 42.

The vertical fins whereto the rudders are hinged are also mounted on the tail-plane and partake of the adjusting movements thereof; the rudder controls are therefore arranged also to pass as near as is practicable to the pivotal axis 30 in order that they may be unaffected by adjustment of the tail-plane. As illustrated, the central rudder carries a laterally-extending bracket 43 which is connected by a rigid member 44 to a lever 45 carried on a shaft 46. The member 44 is arranged to lie as near as convenient to the axis 30 so that any angular movement imparted to it does not materially affect the setting of the rudder. The usual control-cables are connected in any desired manner to the shaft 46 and the various rudders are connected together by strut-like members 47, see Figure 4, so that they all partake of the same movement.

The vertical fins and the rudders are indicated at 19, 20, respectively, and the fins themselves are each constructed as a cantilever extending from the surface of the tail-plane 15 so that no external struts or bracings are required for it. The number of fins and rudders is preferably selected to be different from the number of airscrews on the machine, so that some of them can be arranged to be in a slip-stream and others not in a slip-stream, for the purpose above set forth. In the particular arrangement illustrated, the machine is provided with two engines and with three fins and rudders. The two outer fins are situated each in the slip-stream of an airscrew and the middle fin is situated between the two slip-streams. A similar arrangement of vertical fins is suitable for use with a single-engined machine, in which case only the central fin would be in the slip-stream.

The division of the required fin-area into a number of separate fins offers another advantage, in that by increasing the number of fins, the dimensions of each individual fin can be reduced and the cantilever construction of each fin can be more satisfactorily carried out.

When the vessel is to be armed with guns firing rearwardly, at least two gun-mountings are provided on the hull in a convenient position preferably behind the main planes. These two guns, indicated at 21, 22, are so spaced apart as to provide in plan, parallel lines of fire across the front and rear edges of the laterally-disposed fins and rudders. Referring to Figure 2, it will be seen that the gun 22 can fire in any direction from broadside towards the stern as far as the line 23, but a portion of the field of fire towards the stern is blanked off by the starboard fin and rudder. In order that this blanking-off shall not provide a blind spot, the other gun 21 is so disposed that it can fire along a line 24, which is parallel with the line 23 but crosses the rear end of the starboard rudder 20; with this arrangement the only area blanked off is the projected width of the vertical fin 19 and rudder 20, and this, for the purpose concerned, is a negligible amount. A similar substantially parallel line of fire is simultaneously provided across the front and rear edges of the port fin and rudder, owing to the symmetrical arrangement of the parts. It will be seen that so far as the port and starboard fins are concerned, the two gun-mountings could be arranged to give the desired result by suitably spacing them apart along the centre-line of the hull, but in such a case the central vertical fin and rudder would blank off a certain field of fire, and moreover, the after gun would blank off the directly rearward field of fire of the forward of the two guns, and for this reason the two gun-mountings are offset laterally as far as possible on opposite sides of the centre-line of the hull. With this arrangement their limiting lines of fire 25, 26, on opposite sides of the central fin and rudder, may be made substantially parallel or preferably, as illustrated in Figure 2, they are made convergent, so that the amount blanked off is neither negligible or there is in fact no area blanked off at all.

Turning now to the elevation shown in Figure 1, it will be appreciated that the range of adjustment of the height of each gun on its mounting, as indicated for the gun 21, is such that the limiting lines of fire 27, 28 above and below the tail-plane 15 are very nearly parallel to one another, but the fore-and-aft displacement of the two guns 21, 22 permits them to be arranged, as shown in Figure 1, so that their lines of fire 27 and 29 respectively above and below the tail-plane are parallel with one another so that the field of fire which is blanked off in elevation by the tail-plane is negligible.

Whilst the invention is not limited to the particular arrangement embodying three vertical fins, as hereinbefore described, this is a preferred arrangement, since it gives a convenient compromise between the various factors, such as total fin area, cantilever construction of fins, and limitations imposed by the tail unit on the field of fire; this arrangement is also convenient for use with either single-engined or multi-engined machines.

Furthermore, whilst an important advantage of the particular construction of tail-plane unit hereinbefore described is in relation to its use on armed aircraft, the general advantages of the construction are such as to render it useful on other types of aircraft as well.

What I claim as my invention and desire to secure by Letters Patent is:—

1. In an aircraft, the combination of a fuselage, and a tail-plane unit comprising a tail-plane that is mounted on the fuselage so as to be angularly adjustable about an axis parallel with its leading edge, a plurality of vertical fins supported by said tail-plane, an elevator carried by the tail-plane and a plurality of rudders hinged each to one of said fins, the supports of which fins are solely in the form of cantilevers so carried by the tail-plane that the fins are supported at their base from the surface of the tail-plane whereby the spaces between and at the sides of the fins are left free from bracing, and elevator-controlling members and rudder-controlling members that extend towards, and are provided with a joint in proximity to the hinge axis of the tail-plane, substantially as described.

2. In an armed aircraft, the combination of a fuselage, and a tail-plane unit comprising a tail-plane that is mounted on the fuselage, a plurality of vertical fins supported by said tail-plane, an elevator carried by the tail-plane and a plurality of rudders hinged each to one of said fins, the supports of which fins are solely in the form of cantilevers so carried by the tail-plane that the fins are supported at their base from the surface of the tail-plane whereby the spaces between and at the sides of the fins are left free from bracing, two of which fins are situated off the centre line of the fuselage, one at each side thereof, and two gun mountings arranged on the said fuselage so spaced apart as to provide substantially parallel lines of fire across the front and rear edges of the said vertical fins, each of which guns is arranged to fire across the front edge through the space between one fin and the adjacent end of the tail-plane which is clear of bracing, and to fire across the rear edge of the same fin through the space between the fins which is also clear of bracing, substantially as described.

3. In an armed aircraft, the combination of a fuselage, and a tail-plane unit comprising a tail-plane that is mounted on the fuselage, a plurality of vertical fins supported by said tail-plane, an elevator carried by the tail-plane and a plurality of rudders hinged each to one of said fins, the supports of which fins are solely in the form of cantilevers so carried by the tail-plane that the fins are supported at their base from the surface of the tail-plane whereby the spaces between and at the sides of the fins are left free from bracing, two of which fins are situated off the centre line of the fuselage, one at each side thereof, and a third vertical fin is situated substantially on the centre line, and two gun mountings arranged in said fuselage so spaced apart as to provide substantially parallel lines of fire on the two sides of the said central fin in the spaces free from bracing between the centre fin and the fin on either side thereof, substantially as described.

4. In an armed flying boat, the combination of a fuselage, and a tail-plane unit comprising a tail-plane that is mounted on the fuselage, a plurality of vertical fins supported by said tail-plane, an elevator carried by the tail-plane and a plurality of rudders hinged each to one of said fins, the supports of which fins are solely in the form of cantilevers so carried by the tail-plane that the fins are supported at their base from the surface of the tail-plane whereby the spaces between and at the sides of the fins are left free from bracing, two of which fins are situated off the centre line of the fuselage, one at each side thereof, and two gun mountings arranged on the upper side of the said fuselage so spaced apart as to provide substantially parallel lines of fire across the front and rear edges of the said vertical fins, each of which guns is arranged to fire across the front edge through the space between one fin and the adjacent end of the tail-plane, which is clear of bracing and to fire across the rear edge of the same fin through the space between the fins which is also clear of bracing, which guns are further so disposed as to provide substantially parallel lines of fire above and below the tail-plane, substantially as described.

5. In an aircraft, the combination of a fuselage carrying a plurality of air-screws, and a tail-plane unit comprising a tail-plane that is mounted on the fuselage, a plurality of vertical fins supported by said tail-plane, an elevator carried by the tail-plane and a plurality of rudders hinged each to one of said fins, the supports of which fins are solely in the form of cantilevers so carried by the tail-plane that the fins are supported at their base from the surface of the tail-plane whereby the spaces between and at the sides of the fins are left free from bracing, which fins and rudders exceed in number the number of said air-screws, and some only of said fins are situated in the slip stream of the air-screws, substantially as described.

In testimony whereof I affix my signature.

REGINALD JOSEPH MITCHELL.